United States Patent [19]

Stecker, Sr.

[11] Patent Number: 5,782,279
[45] Date of Patent: Jul. 21, 1998

[54] PORTABLE UNIVERSAL SAW TABLE

[76] Inventor: David W. Stecker, Sr., 23W540 Bryn Mawr, Roselle, Ill. 60172

[21] Appl. No.: 862,568

[22] Filed: May 23, 1997

[51] Int. Cl.⁶ .................... B27B 5/24; B25H 1/00
[52] U.S. Cl. .............. 144/286.1; 83/471.2; 144/287; 144/286.5; 269/901
[58] Field of Search ............. 83/471.2, 471.3, 83/514, 859; 108/139, 142; 269/296, 329, 901, 905; 248/165, 166, 167, 434, 435, 436, 438; 144/286.1, 286.5, 287

[56] References Cited

U.S. PATENT DOCUMENTS

| | | | |
|---|---|---|---|
| 393,210 | 11/1888 | Chapman | 269/901 |
| 970,342 | 9/1910 | Kurt | 144/286.1 |
| 5,144,994 | 9/1992 | Stecker | 144/286.5 |

*Primary Examiner*—W. Donald Bray
*Attorney, Agent, or Firm*—Lee, Mann, Smith, McWilliams, Sweeney & Ohlson

[57] ABSTRACT

A portable saw table used to cross cut lumber and other wood items which includes foldable rail supports which are held in position by removable and discardable cross pieces and which on removal of the cross pieces can be folded to a small size for transport. Extension members telescope into the rail supports to increase the length of the table.

8 Claims, 2 Drawing Sheets

PORTABLE UNIVERSAL SAW TABLE

BACKGROUND OF THE INVENTION

This invention deals with a portable saw table which can be used for cross cutting lumber and other items. My U.S. Pat. No. 5,144,994 issued Sep. 8, 1992 entitled Portable Universal Saw Table, discloses a structure for a saw table which, although is very useful and is portable, cannot be folded up to reduce it to a more easily carried size. Since it is desirable to have tables of this sort and related tables available for easy movement, I have developed a different structure which provides for easy folding for carrying purposes.

SUMMARY OF THE INVENTION

The portable universal saw table of this application is used mainly for cross cutting lumber pieces such as boards, trim, moldings, siding and the like. The table includes two rails which can be mounted in parallel relationship and held there by cross pieces. The cross pieces are designed to be hinged to the rails so that the rails can be folded toward each other to provide a very neat portable package. As is done in my above referred to patent, wooden cross pieces are provided which are fit into notches in the rails. The rails themselves may be made of metal or wood, although metal is more preferred. The table is also provided with a wooden fence member which is used to locate the piece to be cut so that it can be precisely measured and severed at the point desirable for use. The rails also include extension members to increase the length of the table so as to accommodate longer pieces of lumber.

The table of this invention is also provided with removable material racks which can hold the pieces of lumber that are to be cut in an out of the way position, but readily available for use. These material racks are removable and can be placed along side the folded rail construction of the table so that they can also be easily carried.

The portable table is provided with leg sockets so that legs of the desired length can be cut on the job and inserted into the sockets to locate the table at the proper height for use. The cross pieces are generally 2×6 cross members which may be cut to the proper length and be fitted into the table.

A saw platform is also provided on the table so that a rotary saw may be positioned for cutting the various pieces of lumber.

Other advantages of the saw table of this invention will become apparent from the description thereof and the accompanying drawings.

DESCRIPTION OF THE PREFERRED EMBODIMENT

Figure 1:
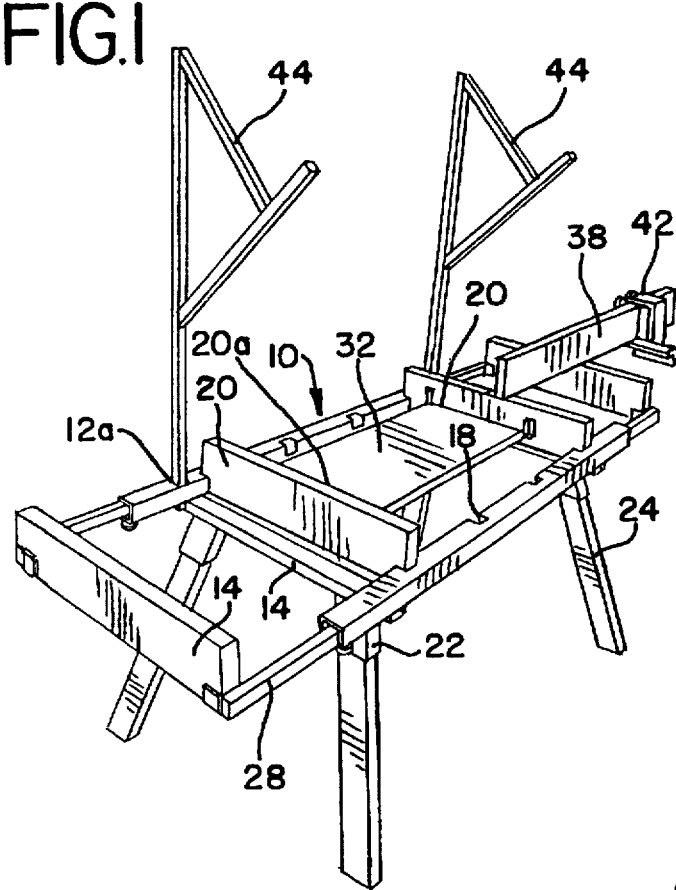
FIG. 1 is a perspective view of the saw table of this invention showing the removable material racks in position and a partial fence piece which acts as a back guide for locating the lumber to be cut.
Figure 4:
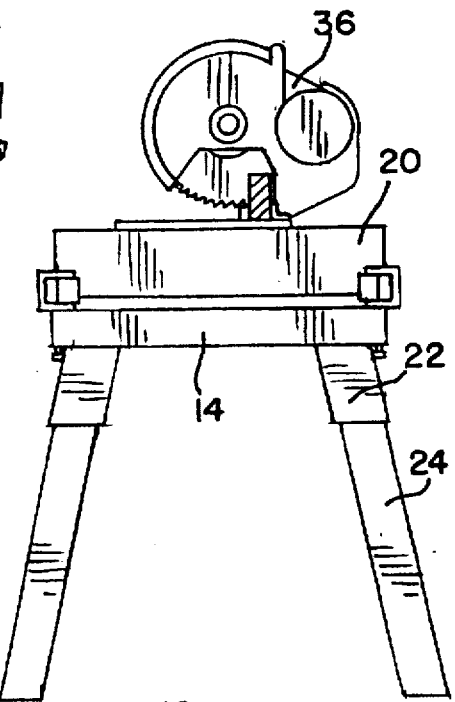
FIG. 4 is an end view also showing the rotary power saw in place on the table for cross cutting.
Figure 5:
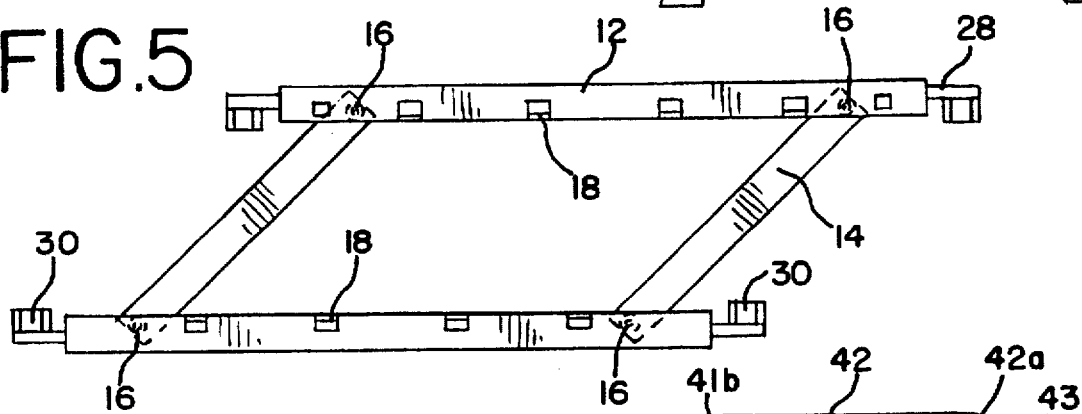
FIG. 5 is a view of the rails of this invention partially folded.

The portable universal saw table 10 is composed of the rails 12 which may be of metal or wood but preferably metal which form the basis of the saw table. There are a pair of the rails 12 which are preferably tubular and of rectangular cross section and connected to each other by cross pieces 20 which are hingedly attached at 16 by bolts, rivets or the like. This construction allows the rails 12 to move parallel to each other so that they may be folded into a compact package. The rails 12 include notches 18 in the top and facing sides of the tubular rails. These notches are designed to hold cross pieces 20 that keep the rails in an open spaced-apart condition. The cross pieces 20, as will be explained later, may be cut from lumber on the job. The cross pieces or support pieces 20 are generally cut from 2×6 lumber to the desired length and then fitted into the notches 18. The support pieces 20 are supported on the notch defining portions of the rails and extend above the rails 12 so that the work pieces to be cut travel along the top surface 20a of the support pieces. The ends of the support pieces abut other notch defining portions of the rails 12 and thus keep the rails in their fully spaced apart condition.

Sockets 30 are provided on the underside of the moveable pair of rails. These sockets 30 are designed to receive the legs for the portable table. Legs 24 may be and preferably are cut from lumber on the job to the desired height. They are fit into the sockets 30. They are held there by the set screws 26.

The pair of rails include extension rails 28 which telescope therein. These extension rails 28 are designed to be extended to enlarge the surface of the portable table. At the end of each of the rails is a socket 28a similar to the notches 18 in the rails 12. These opposing sockets 28a are designed to receive a support piece 20, and each of these end support pieces may be held in place in the sockets 28a of the extension rails by the set screws 28b.

A saw platform 32 is provided for holding the portable rotary saw to be used with the saw table of this invention. The saw platform 32 is held in place by brackets 34 and may be located at any desirable height by moving the brackets up or down on the support pieces 20. The brackets are held in place by screws not shown. A conventional rotary saw 36 is located on the saw platform 32 so that it may be used to cut the lumber in front of it. The saw shown is a standard hand manipulated electrical circular saw. This could also be a table saw, in which case the saw platform 32 would be the table for the saw and this would be held in place by brackets 34.

It may also be desired to have a suitable guide for the saw 36. Such a guide could be fashioned by having wooden pieces attached to the top of and spanning the space between the crosspieces 20 on either side of the saw and a pair of angle bars extending parallel to the cross pieces and spaced to guide the movement of the saw.

Also, if desired, a pair of 2×4's could be attached to the opposite ends of the 2×6 cross pieces 20 above the rails 12, forming a sort of wooden ladder. A stop in the form of a wooden piece or angle bar could then be attached across the 2×4 at a suitable location to form a guide for cutting large pieces of plywood, for example.

A fence member 38 is provided as a back stop for the lumber to be cut so that it can be held in place, measured properly and cut at the proper point. The fence member 38 is secured to the tops of the support pieces 20 by L-brackets 38a and screws 38b (see FIG. 6) and are cut at 38c (see FIG.

Figure 6:
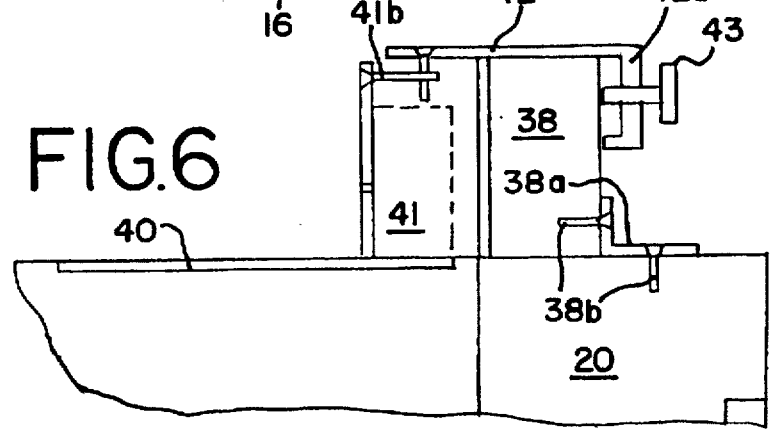
FIG. 6 is a view showing the means for locating the fence on the table in a solid condition.
Figure 2:
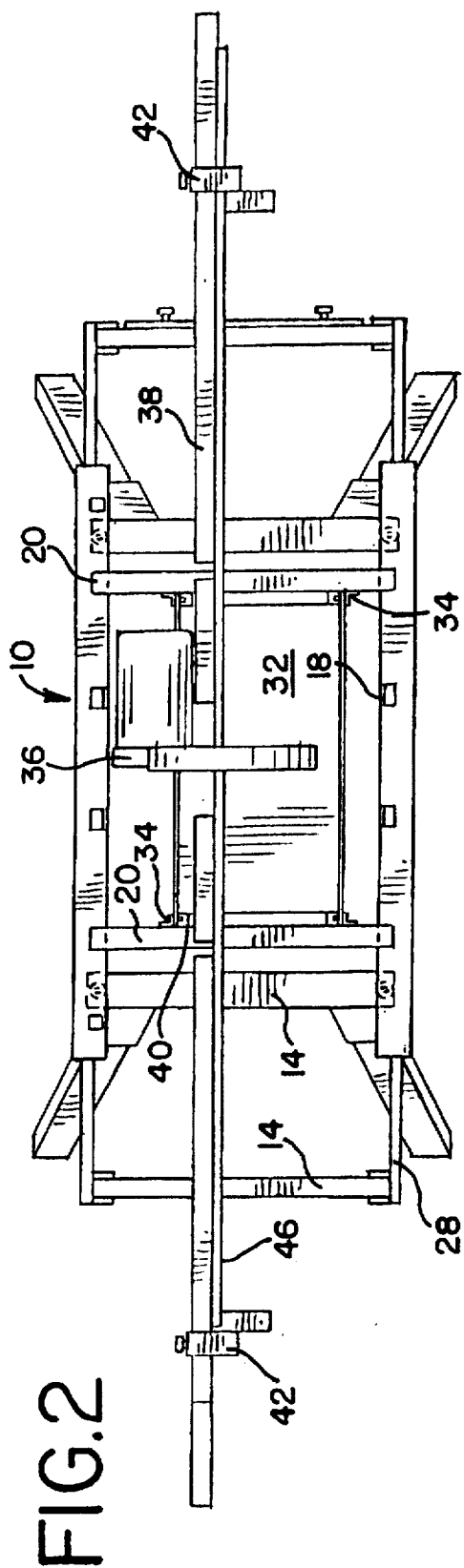
FIG. 2 is a top plan view of the saw table of this invention with the rotary saw in place.
Figure 3:
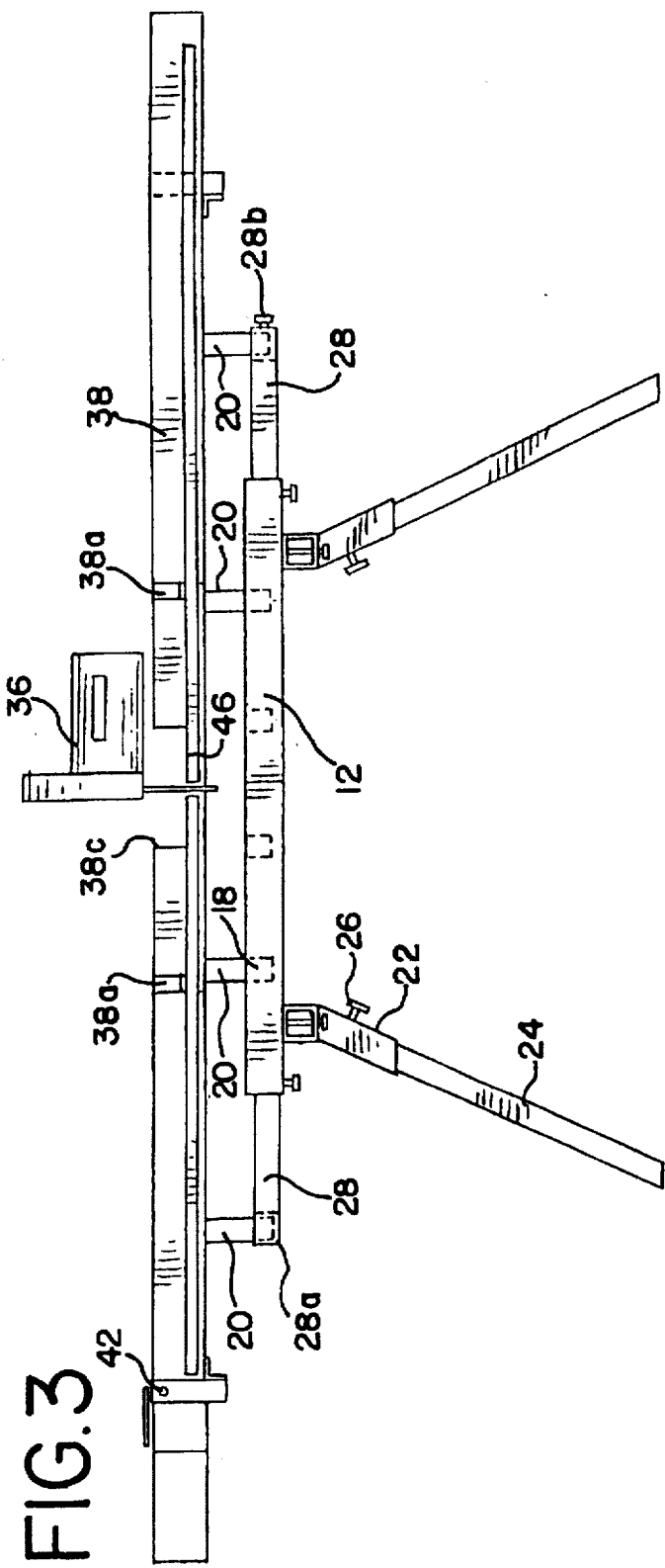
FIG. 3 is a side elevational view of the saw table shown in FIG. 2.

2) to allow for the motion of the rotary saw when it is cutting the lumber or other wood pieces 46. As shown in FIG. 6 an angle bar 40 is pivotally attached to a block 41 as by a screw 41b. This block 41 carries an arm 42 which extends over the top of the fence 38 and a depending outer end 42a of that arm has set screws 43 which permit the angle bar 48 to be moved and locked in place at any desired position along the fence. The angle bar 40 serves as a stop for an end of the work piece 46 so that the latter is properly located prior to and during cutting. Another angle bar also may serve as an additional support for the opposite end of work piece 46. In FIG. 6 the left angle bar serves as a stop and the right angle bar serves as a support. The pivotal attachment of the angle bar allows it to be swung up and out of the way so that it may pass over any of the support pieces 20.

Material racks 44 are provided. These are inserted in holes 12a in the rails 12. They are designed to hold the lumber that is to be cut on the portable table.

As can be seen from the description, the portable universal saw table of this invention is composed mainly of the rails 12 and the cross pieces 14. These are generally made of metal and will be maintained from job to job. Once the table has been used and the work is completed, the cross pieces or support pieces 20 are discarded, the legs 24 are discarded, the fence 38 is discarded and the material racks are removed. The rails 12 may then be rotated on their hinges 16 to provide a very small package which may then be carried to the next job and the portable table reconstructed for use.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A portable saw table comprising:
   a) a pair of spaced apart parallel support rails including means for extending said rails;
   b) means for holding said rails in said parallel spaced apart position;
   c) means for rotably attaching said means for holding said rails whereby said rails can be moved into abutting relationship; and
   d) means for maintaining said rails in said spaced apart position.

2. The saw table of claim 1 wherein said means for extending are extension rails which are telescopingly received in said support rails.

3. The saw table of claim 2 wherein said extension rails include sockets located at the ends thereof for receiving cross pieces for maintaining said extension rails in a spaced apart position.

4. A portable saw table comprising:
   a) a pair of spaced apart parallel metal support rails, each having notches for receiving wooden cross pieces spaced therealong;
   b) a pair of metal cross pieces rotatably attached at each end thereof to said support rails, said cross pieces being adapted to maintain said support rails in said spaced apart condition and on rotation to allow said support rails to move into substantially abutting relationship; and
   c) a plurality of disposable wooden cross pieces located in said notches on said support rails for holding said rails in said spaced apart condition and also for holding work pieces to be sawed on said table.

5. The saw table of claim 4 wherein said support rails include metal extension rails telescopically received therein which are extendable to increase the length of said saw table.

6. The saw table of claim 5 wherein said extension rails include sockets located at the ends thereof for receiving cross pieces for maintaining said extension rails in a spaced apart position.

7. A portable saw table comprising:
   a) a pair of spaced apart parallel support rails;
   b) means for holding said rails in said parallel spaced apart position;
   c) means for rotably attaching said means for holding said rails whereby said rails can be moved into abutting relationship; and
   d) means for maintaining said rails in said spaced apart position including disposable wooden cross pieces which may be cut to the desired length and said support rails include notches for receiving said cross pieces.

8. A portable saw table comprising:
   a) a pair of parallel support rails;
   b) at least two parallel cross pieces extending between said rails and pivotally connected thereto at spaced apart connecting points, whereby said rails can be moved from a substantially adjacent position to a substantially spaced apart position with said cross pieces being substantially perpendicular to said rails in the latter position; and
   c) means for maintaining said rails in said spaced apart position.

* * * * *